United States Patent
Passemard et al.

(10) Patent No.: US 11,544,165 B2
(45) Date of Patent: Jan. 3, 2023

(54) METHOD FOR LOCATING AND REPAIRING INTERMITTENT FAULTS IN COMMUNICATION STRUCTURES OF AN AIRCRAFT

(71) Applicant: Airbus Operations SAS, Toulouse (FR)

(72) Inventors: Philippe Passemard, Toulouse (FR); Alvaro Ruiz Gallardo, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 37 days.

(21) Appl. No.: 16/910,408

(22) Filed: Jun. 24, 2020

(65) Prior Publication Data
US 2020/0409811 A1  Dec. 31, 2020

(30) Foreign Application Priority Data
Jun. 26, 2019 (FR) .................................. 1906978

(51) Int. Cl.
*G06F 11/26* (2006.01)
*G06F 11/22* (2006.01)
(Continued)

(52) U.S. Cl.
CPC .............. *G06F 11/26* (2013.01); *B64D 45/00* (2013.01); *B64F 5/60* (2017.01); *G06F 11/0739* (2013.01);
(Continued)

(58) Field of Classification Search
CPC .... G06F 11/26; G06F 11/0739; G06F 11/221; G06F 13/4027; B64F 5/60; B64D 45/00
See application file for complete search history.

(56) References Cited

U.S. PATENT DOCUMENTS 10,606,784 B1 * 3/2020 Jreij ...................... H04L 9/0618
11,204,884 B1 * 12/2021 Roggendorf ........ G06F 11/2017
(Continued)

FOREIGN PATENT DOCUMENTS

EP          3633631 A1 *  4/2020  ......... B64D 45/0005
WO      2010051224 A1     5/2010
(Continued)

OTHER PUBLICATIONS

Kirkman, Robert A., "Failure Prediction in Electronic Systems", 1966, IEEE Transactions on Aerospace and Electronic Systems, vol. AES-2, No. 6, pp. 700-707 (Year: 1966).*
(Continued)

*Primary Examiner* — Bryce P Bonzo
*Assistant Examiner* — Indranil Chowdhury
(74) *Attorney, Agent, or Firm* — Greer, Burns & Crain, Ltd.

(57) ABSTRACT

To locate an intermittent fault in a communication structure of an aircraft comprising pieces of equipment that are interconnected by cabling forming a plurality of communication media that are shared, an analyzer retrieves an error report relating to transmission errors observed on each of said communication media, performs a count of the transmission errors, per type of error and per communication chain, computes a median of the counts for communication chains comprising the same pair of wired pieces of equipment, and when, for a communication chain, the count exceeds a threshold equal to the median plus a predefined margin, generates an alarm indicating detection of an intermittent fault in association with the communication chain that led the threshold to be exceeded. Thus, intermittent faults are easily located and repaired.

10 Claims, 3 Drawing Sheets

(51) Int. Cl.
  *G06F 11/07* (2006.01)
  *B64F 5/60* (2017.01)
  *B64D 45/00* (2006.01)
  *G06F 13/40* (2006.01)
(52) U.S. Cl.
  CPC ........ *G06F 11/221* (2013.01); *G06F 13/4027* (2013.01)

(56) References Cited

U.S. PATENT DOCUMENTS

| | | | |
|---|---|---|---|
| 2002/0083378 A1* | 6/2002 | Nickels | H04L 1/20 |
| | | | 714/704 |
| 2002/0156954 A1* | 10/2002 | Edwards, Jr. | G06F 11/221 |
| | | | 714/E11.161 |
| 2002/0184568 A1 | 12/2002 | Kurrasch | |
| 2003/0115508 A1 | 6/2003 | Ali et al. | |
| 2006/0230306 A1 | 10/2006 | Richards et al. | |
| 2009/0312897 A1* | 12/2009 | Jamrosz | G06Q 10/06 |
| | | | 701/32.1 |
| 2011/0242989 A1* | 10/2011 | Kim | H04L 27/02 |
| | | | 370/242 |
| 2013/0274991 A1* | 10/2013 | Cheriere | G06F 11/0739 |
| | | | 701/32.9 |
| 2014/0006660 A1* | 1/2014 | Frei | H04L 61/5061 |
| | | | 710/104 |
| 2015/0186234 A1* | 7/2015 | Hofman | G06F 11/26 |
| | | | 714/43 |
| 2016/0179731 A1* | 6/2016 | Fanson | H04L 12/403 |
| | | | 710/306 |
| 2016/0294616 A1* | 10/2016 | Cantaloube | H04L 41/0663 |
| 2019/0385057 A1* | 12/2019 | Litichever | G06N 3/08 |
| 2020/0047914 A1* | 2/2020 | Martin | G07C 5/085 |
| 2021/0019242 A1* | 1/2021 | Dulcey | H04L 41/142 |
| 2021/0126928 A1* | 4/2021 | Jones | G05B 19/042 |

FOREIGN PATENT DOCUMENTS

| | | | | |
|---|---|---|---|---|
| WO | WO-2016085861 A | * | 6/2016 | ......... G06F 11/1641 |
| WO | WO-2020183113 A1 | * | 9/2020 | ......... G05B 23/0205 |

OTHER PUBLICATIONS

French Search Report; priority document.

* cited by examiner

METHOD FOR LOCATING AND REPAIRING INTERMITTENT FAULTS IN COMMUNICATION STRUCTURES OF AN AIRCRAFT

CROSS-REFERENCES TO RELATED APPLICATIONS

This application claims the benefit of the French patent application No. 1906978 filed on Jun. 26, 2019, the entire disclosures of which are incorporated herein by way of reference.

FIELD OF THE INVENTION

The present invention relates to the field of the location and repair of intermittent faults in communication structures, including wires and wired equipment interfaces, already installed in or in the process of being installed in an aircraft.

BACKGROUND OF THE INVENTION

Many pieces of equipment of an aircraft are connected by communication structures including wires and wired equipment interfaces. This may represent several hundred meters of wires within the aircraft. Such communication structures are, for example, constructed about a plurality of CAN (Controller Area Network) buses, as defined in standard ISO 11898.

To locate faults or defects in such communication structures, reflectometry tools are typically used. Reflectometry is a diagnostic method that is based on the radar principle. A probe signal is injected into the cabling, and when this probe signal encounters a discontinuity in impedance, some of its energy is reflected back toward the point of injection. A fine analysis of this reflected energy allows information on the characteristics of the cabling to be deduced. However, these reflectometry tools do not allow intermittent faults in wired equipment interfaces to be detected. Specifically, it is necessary to unplug any equipment connected to the cabling to test the cabling itself, this being particularly time consuming and possibly furthermore being a source of new electrical connection problems if the equipment is not reconnected with great care.

Certain faults in these communication structures have an intermittent character that makes them even more tedious to locate, in particular as regards the wires themselves.

It would thus be desirable to mitigate these drawbacks of the prior art. It would in particular be desirable to provide a solution that would allow the location and repair of intermittent faults in communication structures, including wires and wired equipment interfaces, already installed in or in the process of being installed in an aircraft, to be simplified.

SUMMARY OF THE INVENTION

One subject of the present invention is to provide a method for locating an intermittent fault in a communication structure of an aircraft during a phase of manufacture and/or phase of service of the aircraft, the communication structure comprising pieces of equipment that are interconnected by cabling forming a plurality of communication media that are shared between the pieces of equipment, the method being implemented by an analyzer comprising electronic circuitry configured to perform the following steps: retrieving an error report relating to transmission errors observed on each of the communication media; performing a first count of the transmission errors, per type of error and per communication chain, a communication chain being an assembly formed by a first piece of equipment that initiated the transmission in question, a second piece of equipment that was the intended recipient of the transmission in question and one or more wires of the cabling forming one communication medium between the first piece of equipment and the second piece of equipment; computing a first median of the first counts for communication chains comprising the same pair of wired pieces of equipment; and when, for a communication chain, the first count exceeds a first threshold equal to the median plus a predefined margin, generating an alarm indicating detection of an intermittent fault in association with the communication chain that led the first threshold to be exceeded.

Thus, the location of intermittent faults in communication structures, including wires and wired equipment interfaces, already installed in or in the process of being installed in an aircraft, is simplified. Specifically, by identifying communication chains exhibiting quantities of errors higher than the median plus the predefined margin, it is possible to detect an intermittent cabling fault that would not necessarily be detected by conventional conformity tests, because of the intermittent character of the fault in question. In other words, considering a pair of pieces of equipment, when one communication medium among those possible between the two pieces of equipment exhibits a quantity of errors higher than the median of the errors observed for all of the communication media between the two pieces of equipment in question, a cabling fault or a fault in the interface connecting the pieces of equipment to the cabling is detected.

In one particular embodiment, the alarm indicating detection of an intermittent fault is generated when, furthermore, there is a concordance in the results for services using the communication chain in question.

In one particular embodiment, the method comprises the following step, before the first count is performed: performing filtering by error grouping, by virtue of their respective fault codes, using a dictionary of fault codes.

In one particular embodiment, the method comprises the following step, before the first count is performed: performing filtering comprising isolating a portion of the retrieved error report corresponding to errors relating to one or more selected communication chains and/or to errors contained in a parameterized duration and/or to services using the communication structure.

In one particular embodiment, the cabling is a plurality of CAN buses forming the communication media.

In one particular embodiment, the method furthermore comprises the following steps: comparing, for each communication chain, the performed first count with performed second counts in reference error reports stored in a database providing a statistical reference of the errors usually observed during phases of manufacture and/or phases of service of aircraft; and, when the first count exceeds a second threshold equal to the median of the second counts plus the predefined margin, generating an alarm indicating detection of an intermittent fault in association with the communication chain that led the second threshold to be exceeded.

Another subject of the present invention is provision of a computer-program product, which may be stored on a medium and/or downloaded from a communication network, in order to be read by a processor. This computer program contains instructions for implementing the aforementioned method, when the program is executed by the processor. Another subject of the present invention is provision of a data-storage medium on which such a computer program is stored.

Another subject of the present invention is provision of a method for repairing an intermittent fault in a communication structure of an aircraft during a phase of manufacture and/or phase of service of the aircraft, the communication structure comprising pieces of equipment that are interconnected by cabling forming a plurality of communication media that are shared between the pieces of equipment, the method comprising the above method for locating the intermittent fault, and furthermore the following steps: performing a drawing analysis, based on the technical drawings used to design the aircraft, so as to determine the location of the communication chain suspected of having an intermittent fault; and performing a physical analysis and targeted repair of the communication chain.

Another subject of the present invention is provision of an analyzer configured to locate an intermittent fault in a communication structure of an aircraft during a phase of manufacture and/or phase of service of the aircraft, the communication structure comprising pieces of equipment that are interconnected by cabling forming a plurality of communication media that are shared between the pieces of equipment, the analyzer comprising electronic circuitry configured to implement: means for retrieving an error report relating to transmission errors observed on each of the communication media; means for performing a first count of the transmission errors, per type of error and per communication chain, a communication chain being an assembly formed by a first piece of equipment that initiated the transmission in question, a second piece of equipment that was the intended recipient of the transmission in question and one or more wires of the cabling forming one communication medium between the first piece of equipment and the second piece of equipment; means for computing a first median of the first counts for communication chains comprising the same pair of wired pieces of equipment; and when, for a communication chain, the first count exceeds a threshold equal to the median plus a predefined margin, means for generating an alarm indicating detection of an intermittent fault in association with the communication chain that led the threshold to be exceeded.

BRIEF DESCRIPTION OF THE DRAWINGS

The aforementioned features of the invention, and others, will become more clearly apparent on reading the following description of at least one exemplary embodiment, the description being given with reference to the appended drawings, in which.

DETAILED DESCRIPTION OF THE PREFERRED EMBODIMENTS

Figure 1:
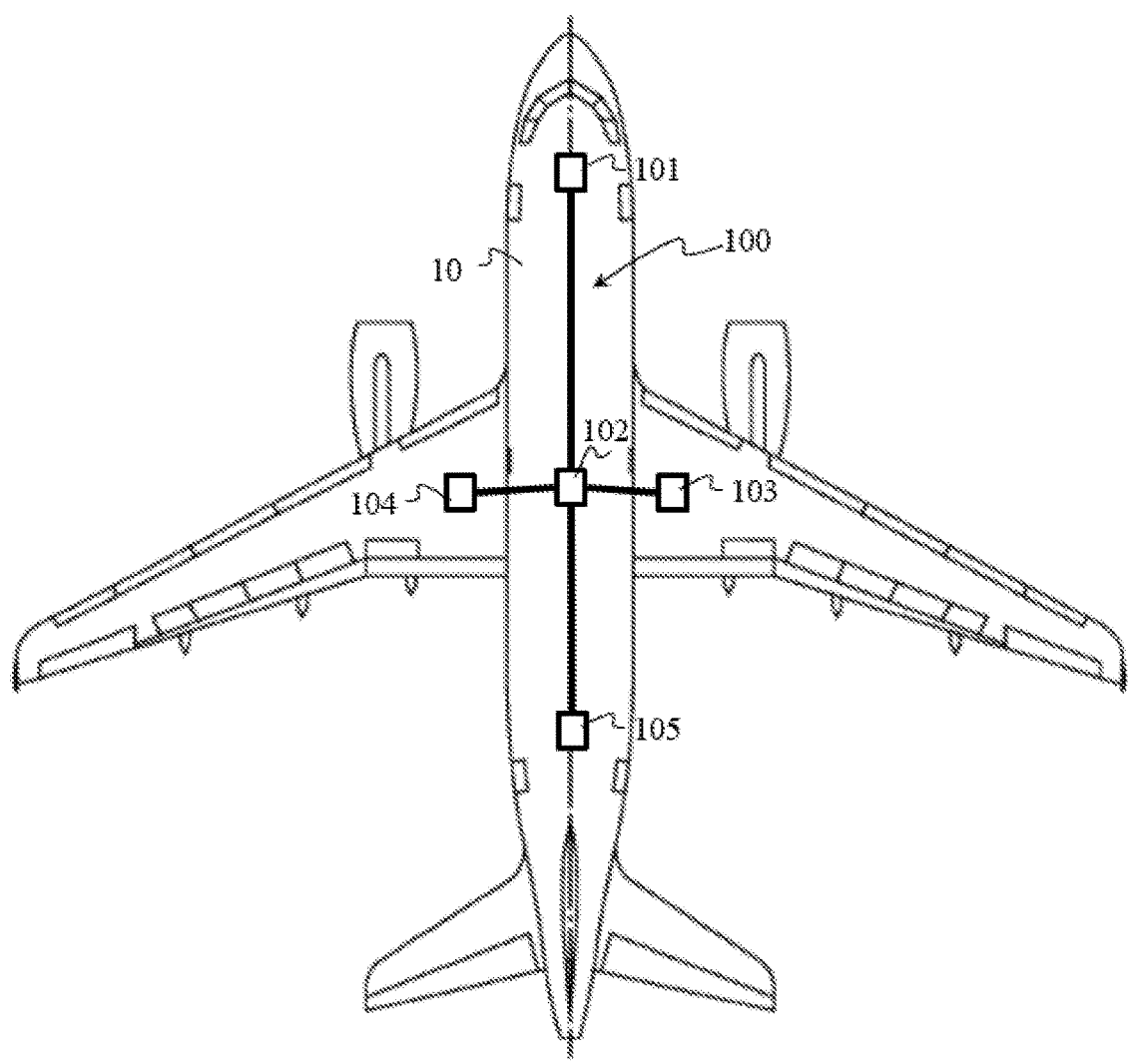
FIG. 1 schematically illustrates, as seen from above, an aircraft equipped with at least one communication structure that allows communication between pieces of equipment installed in the aircraft.

FIG. 1 thus schematically illustrates, as seen from above, an aircraft 10. The aircraft 10 comprises one or more communication structures, taking the form of a plurality of data buses or data networks, thus providing a redundant capacity in transmission paths between interconnected pieces of equipment. Such a communication structure 100 is shown in FIG. 1. The communication structure 100 comprises cabling 115 creating a plurality of communication media that are shared by a set of pieces of equipment 101, 102, 103, 104, 105. The pieces of equipment 101, 102, 103, 104, 105 comprise communication interfaces allowing the pieces of equipment 101, 102, 103, 104, 105 to be electrically linked to the cabling 115, in order to set up the communication media.

FIG. 1 shows, purely illustratively, five pieces of equipment 101, 102, 103, 104, 105 connected to the cabling 115, but modern aircraft typically contain such communication structures that interconnect a much higher number of pieces of equipment, such as computers, sensors, actuators, etc.

Figure 2:
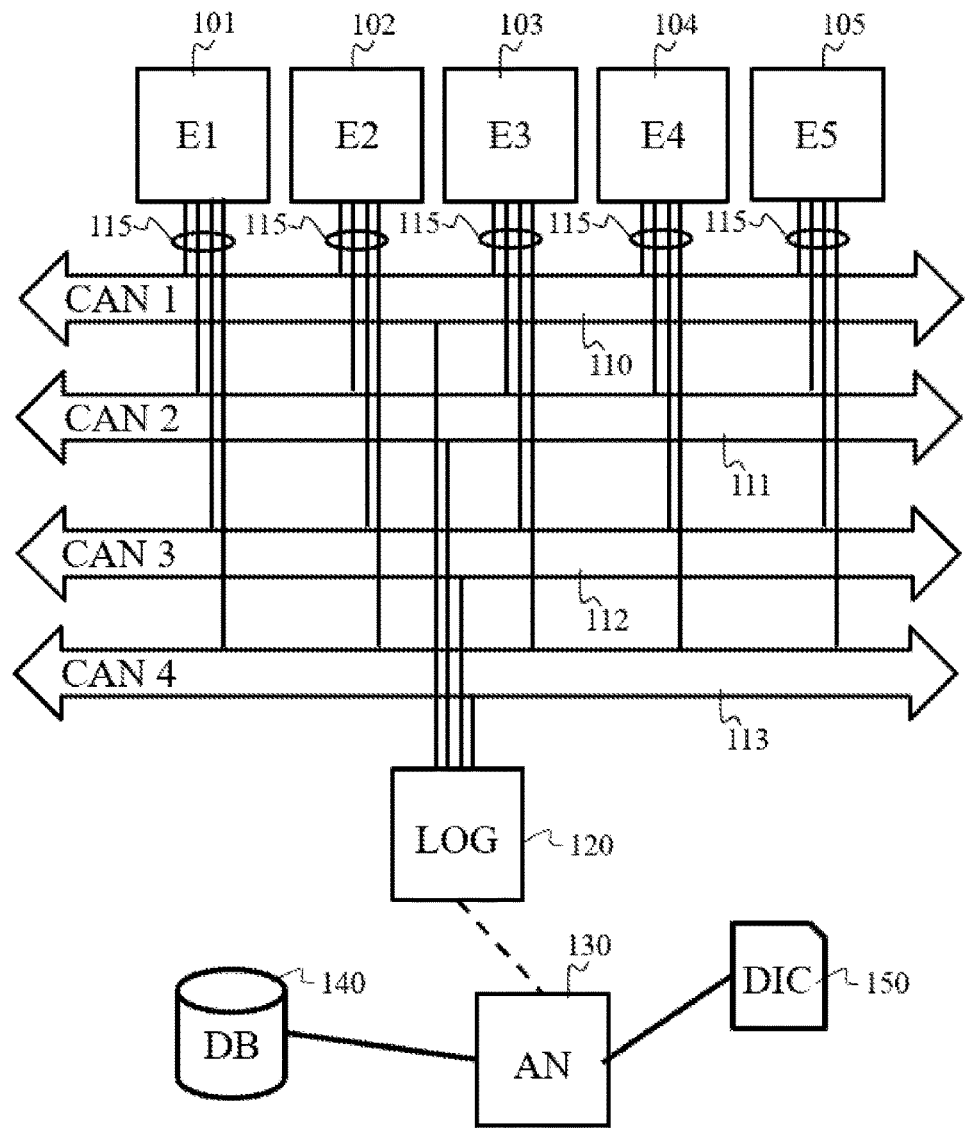
FIG. 2 schematically illustrates an example of an embodiment of such a communication structure.

FIG. 2 schematically illustrates an exemplary embodiment of the communication structure 100. Shown therein are the pieces of equipment 101, 102, 103, 104, 105, which have been labelled E1, E2, E3, E4 and E5, respectively. The pieces of equipment 101, 102, 103, 104, 105 are interconnected by virtue of cabling 115. The cabling 115 provides a plurality of communication media, for example formed by a plurality of CAN communication buses, here a first communication bus CAN1 110, a second communication bus CAN2 111, a third communication bus CAN3 112, and a fourth communication bus CAN4 113. The communication structure 100 furthermore comprises an event logger LOG 120.

The event logger LOG 120 comprises electronic circuitry apt and configured to record events occurring during transmissions via the communication structure 100. More particularly, the event logger LOG 120 records errors in transmissions via the communication structure 100 and therefore via the various communication media. These errors are represented by fault codes and are stored in association with, at least, information on the time of occurrence of the error and information on the communication chain involved. A communication chain must be understood as being the assembly formed by a first piece of equipment that initiated the transmission in question, a second piece of equipment that was the intended recipient of the transmission in question and one or more wires forming one such communication medium between the first piece of equipment and the second piece of equipment. The electronic circuitry of the event logger LOG 120 is thus apt and configured to export an error report listing the events recorded by the event logger LOG 120.

The event logger LOG 120 furthermore comprises an upload-download interface allowing the event logger LOG 120 to be configured from an external apparatus and allowing the error report to be transmitted to the external apparatus. For example, the upload-download interface is a USB (Universal Serial Bus) interface or a Bluetooth interface or a Wi-Fi interface. Thus, the error report may be easily retrieved at various moments during the assembly of the aircraft in manufacturing phase and/or easily retrieved at the boarding gate or on the airport apron in service phase. This allows error reports to be retrieved throughout the assembly of the aircraft 10 and/or throughout its service phase, without having to disassemble the communication structure, as would be the case with reflectometry tools.

FIG. 2 furthermore shows an analyzer AN 130 comprising electronic circuitry (a computer for example) apt and configured to analyze any error report retrieved, directly or indirectly, from the event logger LOG 120. For example, the analyzer AN 130 may retrieve the error report via the Internet, or via a USB port of the event logger LOG 120, or via a USB key first plugged into the event logger LOG 120 so as to read the error report from memory then into the analyzer AN 130 so as to transfer it thereto. The analyzer AN 130, by virtue of the analysis of the error report, assists in the location of an intermittent fault (e.g., a partially defective solder joint or an unwanted contact to a connector pin, etc.) potentially present in the communication structure 100 and assists in its repair.

Transmission errors in such communication structures are not necessarily representative of a fault or defect. For example, errors may arise because of radio interference encountered for a brief period of time. It is thus recommendable, in the error reports, to distinguish between errors that are inherent to the nominal operation of such and such a communication chain and errors that are representative of intermittent faults. This aspect is detailed below with reference to FIG. 4.

Optionally, the analyzer AN 130 incorporates or is connected to a database DB 140. As detailed below, the database DB 140 may serve as a reference allowing the presence of one or more potential intermittent faults in the communication structure 100 to be evaluated. The database DB 140 stores error reports collected beforehand during phases of manufacture and/or phases of service of a multitude of aircraft. The error reports stored in the database DB 140 are sufficiently numerous to obtain a statistical reference of the errors usually observed during the phases of manufacture and/or phases of service of aircraft. The intermittent faults that the analyzer AN 130 aims to assist in locating and resolving are sufficiently rare for the error reports that concern them and that are optionally also stored in the database DB 140 to have a negligible impact on the statistical reference.

Optionally, the analyzer AN 130 incorporates or is connected to a dictionary of fault codes DIC 150. The fault codes used in the communication structures and contained in the error reports may be particularly numerous and difficult to interpret as such. The dictionary of fault codes DIC 150 allows, on request from the analyzer AN 130, a fault code to be converted into a string of characters that is semantically easier to interpret, in particular by a human operator. The dictionary of fault codes DIC 150 may furthermore allow fault codes that belong to a given family and that, in this respect, are indicative of a given type of transmission error, to be identified.

Figure 3:
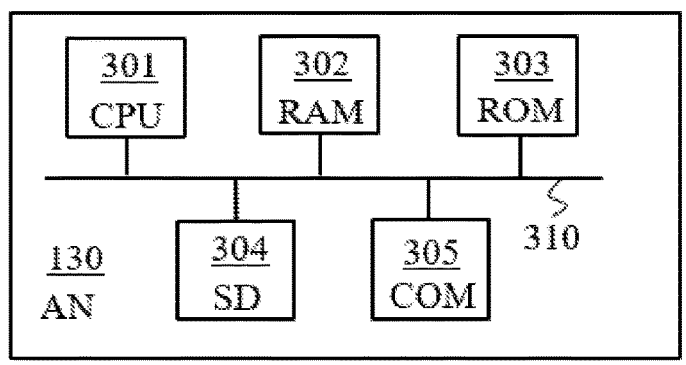
FIG. 3 schematically illustrates an example of a hardware architecture of an analyzer intended to assist with the location and repair of intermittent faults in such a communication structure.

FIG. 3 schematically illustrates an example of a hardware architecture of the analyzer AN 130. The event logger LOG 120 may be constructed with a schematically similar hardware architecture.

The analyzer AN 130 then comprises, linked by a communication bus 310: a processor or CPU (Central Processing Unit) 301; a RAM (Random-Access Memory) 302; a ROM (Read-Only Memory) or EEPROM (Electrically-Erasable Programmable ROM) 303; a storage unit 304, such as an HDD (Hard Disk Drive), or a storage medium reader, such as an SD (Secure Digital) card reader; and a communication-interface manager COM 305.

The processor 301 is capable of executing instructions loaded into the RAM 302 from the ROM or EEPROM 303, from an external memory, from a storage medium (such as an SD card), or from a communication network. When the analyzer AN 130 is turned on, the processor 301 is capable of reading, from the RAM 302, instructions and of executing them. These instructions form a computer program causing the implementation, by the processor 301, of all or some of the steps and operations described here in relation to the analyzer AN 130.

All or some of the steps and operations described here in relation to the analyzer AN 130 may thus be implemented in software form by executing a set of instructions with a programmable machine, for example a DSP (Digital Signal Processor) or a microcontroller, or be implemented in hardware form by a machine or dedicated component, for example an FPGA (Field-Programmable Gate Array) component or an ASIC (Application Specific Integrated Circuit) component. Generally, the analyzer AN 130 comprises electronic circuitry apt and configured to implement, in software and/or hardware form, the operations and steps described here in relation to the analyzer AN 130.

Figure 4:
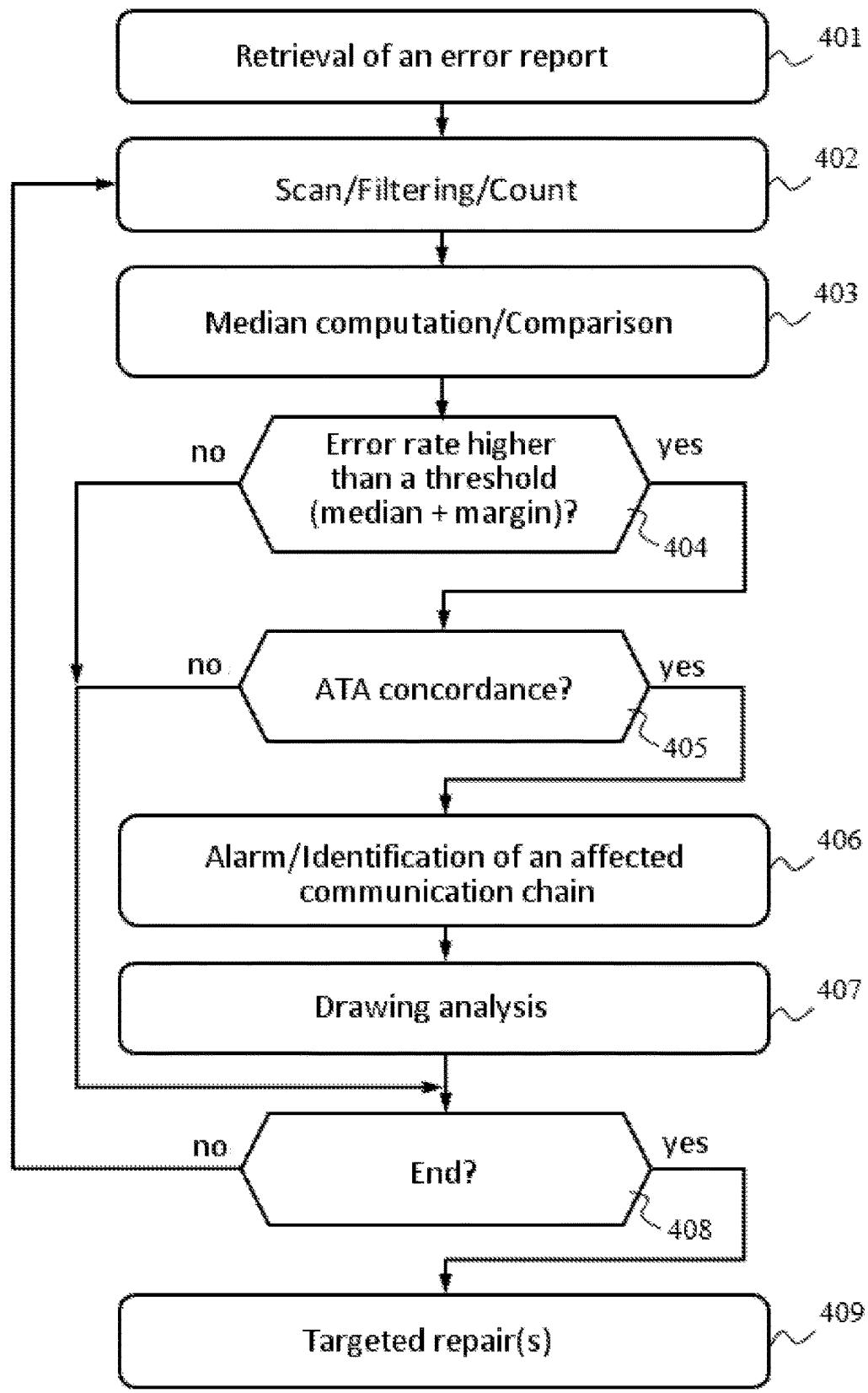
FIG. 4 schematically illustrates a flowchart of a method for assisting with the location and repair of intermittent faults.

FIG. 4 schematically illustrates a flowchart of a method for assisting with the location and repair of intermittent faults.

In a step 401, the analyzer AN 130 retrieves an error report. The error report is, for example, retrieved after one or more flights performed by the aircraft 10 in service phase. This allows a defect in the communication structure to be located and repaired before it leads to a disabling fault. The error report is, for example, retrieved after one or more days of presence of the aircraft 10 at a given station, or on a change of station, in manufacturing phase.

In as the step 402, the analyzer AN 130 scans the error report. The analyzer AN 130 performs a count of the errors and more particularly one count per communication chain existing in the communication structure and per type of error observed. To do this, the analyzer AN 130 may perform filtering on the error report. The filtering may be parameterized by a human operator via a human-machine interface of the analyzer AN 130. The filtering may comprise isolating a portion of the error report corresponding to errors relating to one or more selected communication chains and/or to errors contained in a parameterized duration and/or to services using the communication structure. For example, such services are classified with respect to the ATA (Air Transport Association) chapter to which these services belong, such as defined in the specifications "ATA Specification 100—Specification for Manufacturers' Technical Data, Revision No. 37 (1999)". For example, filtering over a parameterized duration may comprise filtering errors recorded during each flight, or during a day or a week at a station of an assembly line, etc.

The filtering may also comprise grouping errors of a given family, by virtue of their respective fault codes, using the dictionary of fault codes DIC 150.

In a step 403, the analyzer AN 130 computes a first median of the counts of the step 402 performed for communication chains comprising the same pair of wired pieces of equipment. Specifically, given that the cabling 115 provides a plurality of communication media and therefore a plurality of corresponding communication paths, each pair of pieces of equipment is part of a plurality of communication chains. Thus, for each pair of pieces of equipment considered, the analyzer AN 130 computes the median of the counts of the step 402 pertaining to the various communication paths available to the pair of pieces of equipment. With reference to FIG. 2 and considering the pair of pieces of equipment formed by the piece of equipment E1 101 and the piece of equipment E3 103, the analyzer AN 130 computes the median of the counts of the step 402 for, respectively: (a) the communication chain formed by the piece of equipment E1 101, the bus CAN1 110 and the piece of equipment E3 103; (b) the communication chain formed by the piece of equipment E1 101, the bus CAN2 111 and the piece of equipment E3 103; (c) the communication chain formed by the piece of equipment E1 101, the bus CAN3 112 and the piece of equipment E3 103; and (d) the communication chain formed by the piece of equipment E1 101, the bus CAN4 113 and the piece of equipment E3 103. For each communication chain, the analyzer AN 130 compares the errors counted in the step 402, optionally after filtering, with the first median thus computed, to which a predefined margin is added, 20% for example.

Optionally, in the step 403, the analyzer AN 130 compares the errors counted in the step 402, optionally after filtering, with reference error reports stored in the database DB 140. When filtering is applied in the step 402, reference error reports are selected in the database DB 140 consistently with the applied filtering. The comparison comprises comparing the count, of the errors per type of error and per communication chain, performed in the step 402, with a second median of the count, of errors of the same type and for the same communication chain, in the reference error reports obtained from the database DB 140, to which median the predefined margin is added.

In a first step 404, the analyzer AN 130 verifies whether the count of the step 402 is higher than a first preset threshold equal to the aforementioned first median plus the aforementioned predefined margin. If such is the case, a step 405 is performed; otherwise, a step 408 is performed.

Optionally, in the step 404 (when the aforementioned first threshold is not exceeded), the analyzer AN 130 verifies whether the count of the step 402 is higher than a second preset threshold equal to the aforementioned second median plus the aforementioned predefined margin. If such is the case, the step 405 is performed; otherwise, the step 408 is performed.

In the step 405, which is optional, the analyzer AN 130 verifies whether there is a concordance in the results for services using the communication chain that exhibited an exceedance of the first threshold (and/or the second threshold) in the step 404. For example, a service classified as belonging to ATA chapter 28 and a service classified as belonging to ATA chapter 42 use the communication chain and each exhibit the threshold exceedance. The verification of this concordance allows false alarms indicating detection of an intermittent fault to be avoided. If there is a concordance, a step 406 is performed; otherwise, the step 408 is performed.

In the step 406, the analyzer AN 130 generates an alarm indicating a suspicion of an intermittent fault. In association, the analyzer AN 130 identifies the communication chain that is affected by the threshold exceedance and that is therefore suspected of containing an intermittent fault. In the case of the first threshold, a cabling fault or a fault in the interface connecting a piece of equipment to the cabling at a point of convergence of the communication media may thus be detected. For example, the analyzer AN 130 displays on a screen information allowing a human operator to identifier the communication chain in question.

In a step 407, drawing analysis is carried out, based on the technical drawings used to design the aircraft 10, so as to determine the location of the communication chain suspected of having an intermittent fault. Next, the step 408 is performed.

In the step 408, the analyzer AN 130 verifies whether the entirety of the error report has been scanned. If such is the case, a step 409 is performed; otherwise, the analyzer AN 130 continues to scan the error report, beginning again at the step 402.

In the step 409, a physical analysis and a targeted repair of each communication chain for which an intermittent fault has been detected are performed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for locating an intermittent fault in a communication structure of an aircraft during at least one of a phase of manufacture and a phase of service of the aircraft, the communication structure comprising pieces of equipment that are interconnected by cabling forming a plurality of communication media that are shared between said pieces of equipment, the method being implemented by an analyzer comprising electronic circuitry configured to perform the following steps:

retrieving an error report relating to transmission errors observed on each of said communication media;

performing a plurality of first counts of the transmission errors, wherein a corresponding first count is performed, per type of error and per each of a plurality of communication chains, each communication chain being an assembly formed by a first piece of equipment that initiated a transmission in question, a second piece of equipment that was an intended recipient of the transmission in question and a plurality of wires of said cabling forming one said communication medium between the first piece of equipment and the second piece of equipment, the plurality of wires providing a redundant capacity in transmission paths between the first piece of equipment and the second piece of equipment;

computing a first median of the first counts for the plurality of communication chains comprising the same pair of wired pieces of equipment;

when, for one such communication chain, the first count exceeds a first threshold equal to the first median plus a predefined margin, generating an alarm indicating detection of an intermittent fault in association with the one such communication chain that led said first threshold to be exceeded.

2. The method according to claim 1, wherein the alarm indicating detection of an intermittent fault is generated when, furthermore, there is a concordance in results for services using the one such communication chain in question.

3. The method according to claim 1, comprising, before the plurality of first counts is performed, the following step:

performing filtering by error grouping, by virtue of a plurality of respective fault codes, using a dictionary of fault codes.

4. The method according to claim 1, comprising, before the plurality of first counts is performed, the following step:
performing filtering comprising isolating a portion of the retrieved error report corresponding to errors relating to at least one of
one or more selected communication chains in the plurality of communication chains,
errors contained in a parameterized duration, and
services using the communication structure.

5. The method according to claim 1, wherein the cabling is a plurality of CAN buses forming said communication media.

6. The method according to claim 1, furthermore comprising the following steps:
comparing, for each communication chain in the plurality of communication chains, the performed corresponding first count with a plurality of second counts in a plurality of reference error reports stored in a database providing a statistical reference of a plurality of errors usually observed during at least one of phases of manufacture and phases of service of aircraft; and
when the corresponding first count exceeds a second threshold equal to the median of the second counts plus said predefined margin, generating the alarm indicating detection of an intermittent fault in association with a first communication chain that led said second threshold to be exceeded.

7. A method for repairing an intermittent fault in a communication structure of an aircraft during at least one of a phase of manufacture and a phase of service of the aircraft, the communication structure comprising pieces of equipment that are interconnected by cabling forming a plurality of communication media that are shared between said pieces of equipment,
the method comprising the method for locating the intermittent fault according to claim 1, and furthermore the following steps:
performing a drawing analysis, based on technical drawings used to design the aircraft, to determine a location of the one such communication chain suspected of having an intermittent fault; and
performing a physical analysis and targeted repair of said one such communication chain.

8. A computer-implemented method that includes the steps of the method according to claim 1.

9. A non-transitory computer readable storage medium storing a computer program containing instructions that lead to an execution, by a processor, of the method according to claim 1, when said instructions are read and executed by the processor.

10. An analyzer configured to locate an intermittent fault in a communication structure of an aircraft during at least one of a phase of manufacture and a phase of service of the aircraft, the communication structure comprising pieces of equipment that are interconnected by cabling forming a plurality of communication media that are shared between said pieces of equipment, the analyzer comprising electronic circuitry configured to implement:
means for retrieving an error report relating to transmission errors observed on each of said communication media;
means for performing a plurality of first counts of the transmission errors, wherein a corresponding first count is performed, per type of error and per each of a plurality of communication chains, each communication chain being an assembly formed by a first piece of equipment that initiated a transmission in question, a second piece of equipment that was an intended recipient of the transmission in question and a plurality of wires of said cabling forming one said communication medium between the first piece of equipment and the second piece of equipment, the plurality of wires providing a redundant capacity in transmission paths between the first piece of equipment and the second piece of equipment;
means for computing a first median of the first counts for the plurality of communication chains comprising the same pair of wired pieces of equipment; and
when, for one such communication chain, the first count exceeds a first threshold equal to said median plus a predefined margin, means for generating an alarm indicating detection of an intermittent fault in association with the one such communication chain that led said threshold to be exceeded.

* * * * *